(12) United States Patent
Li et al.

(10) Patent No.: US 8,012,890 B1
(45) Date of Patent: Sep. 6, 2011

(54) FLAME RESISTANT FABRICS HAVING A HIGH SYNTHETIC CONTENT AND PROCESS FOR MAKING

(75) Inventors: Shulong Li, Spartanburg, SC (US); Richard A. Mayernik, Mauldin, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 12/261,238

(22) Filed: Oct. 30, 2008

Related U.S. Application Data

(63) Continuation of application No. 11/765,002, filed on Jun. 19, 2007, now abandoned.

(51) Int. Cl.
*B32B 5/02* (2006.01)
*B32B 27/12* (2006.01)

(52) U.S. Cl. ......... 442/136; 442/141; 442/164; 428/913

(58) Field of Classification Search .................... 442/97, 442/136, 164, 141
See application file for complete search history.

(56) References Cited

U.S. PATENT DOCUMENTS

| | | | |
|---|---|---|---|
| 3,900,664 A | 8/1975 | Miller | |
| 3,931,310 A * | 1/1976 | Nachbur et al. ................. | 564/15 |
| 4,035,542 A | 7/1977 | Rosenthal et al. | |
| 4,078,101 A | 3/1978 | Cole | |
| 4,092,108 A | 5/1978 | Valko et al. | |
| 4,098,704 A | 7/1978 | Sandler ......................... | 252/8.6 |
| 4,145,463 A | 3/1979 | Cole | |
| 4,151,322 A | 4/1979 | Rosenthal et al. | |
| 4,154,516 A | 5/1979 | Wagensonner et al. | |
| 4,178,399 A | 12/1979 | Hall et al. ...................... | 427/381 |
| 4,311,855 A | 1/1982 | Colet et al. | |
| 4,419,401 A | 12/1983 | Pearson | |
| 4,494,951 A | 1/1985 | Cole et al. | |
| 4,513,042 A | 4/1985 | Lumb | |
| 4,631,788 A | 12/1986 | Dischler et al. .................... | 26/25 |
| 4,732,789 A | 3/1988 | Hauser et al. | |
| 4,750,911 A | 6/1988 | Hansen et al. .................... | 8/584 |
| 4,812,144 A | 3/1989 | Hansen ............................. | 8/584 |
| 4,837,902 A | 6/1989 | Dischler ............................ | 26/1 |
| 4,842,609 A | 6/1989 | Johnson ......................... | 8/115.7 |
| 4,868,041 A | 9/1989 | Yamagashi et al. | |

(Continued)

FOREIGN PATENT DOCUMENTS

EP     0 248 553     1/1993

(Continued)

OTHER PUBLICATIONS

CYTEC, PYROSET® TPC Flame Retardant: An application manual for a wash durable, flame retardant finish to cellulosic blends, Oct. 2004, 33 pages.

(Continued)

*Primary Examiner* — Lynda Salvatore
(74) *Attorney, Agent, or Firm* — Robert M. Lanning

(57) ABSTRACT

Provided herein are flame resistant fabrics having a thermoplastic fiber content of as much as 65% (where no more than 5% of the fibers are non-thermoplastic synthetic fibers). The flame resistant properties are imparted by treating the fabric with one or more flame retardant chemicals and then by curing the treated fabric at high temperatures. Optionally, softeners, stain release agents, soil repellent agents, permanent press resins, and the like may be added to the bath of flame retardant chemicals. Alternately, the treated fabric may be subjected to mechanical treatment to increase softness. The fabrics produced by the present process exhibit improved performance and tear strength, as compared to conventionally treated fabrics.

15 Claims, 1 Drawing Sheet

U.S. PATENT DOCUMENTS

| | | | |
|---|---|---|---|
| 4,909,805 A | 3/1990 | Smith | |
| 4,918,795 A | 4/1990 | Dischler | 26/1 |
| 4,920,000 A | 4/1990 | Green | |
| 4,990,368 A | 2/1991 | Johnson et al. | 427/190 |
| 5,033,143 A | 7/1991 | Love, III | 8/158 |
| 5,223,724 A | 6/1993 | Green | |
| 5,238,464 A | 8/1993 | Johnson et al. | 8/127.1 |
| 5,356,700 A | 10/1994 | Tanaka et al. | |
| 5,468,545 A | 11/1995 | Fleming et al. | |
| 5,506,042 A | 4/1996 | Ichibori et al. | |
| 5,759,207 A | 6/1998 | Green | |
| 5,822,835 A | 10/1998 | Dischler | 28/167 |
| 5,876,849 A | 3/1999 | Green | |
| 5,928,971 A | 7/1999 | Ellis et al. | |
| 6,358,608 B1 | 3/2002 | Hanyon et al. | 428/362 |
| 6,546,605 B1 | 4/2003 | Emery et al. | 28/167 |
| 6,626,964 B1 | 9/2003 | Lunsford et al. | |
| 6,787,228 B2 | 9/2004 | Campbell et al. | 428/365 |
| 7,156,888 B2 | 1/2007 | Mochizuki | 51/307 |
| 7,182,991 B1 | 2/2007 | Hirschmann, Jr. et al. | 428/86 |
| 7,402,538 B2 | 7/2008 | Bader et al. | 442/209 |
| 2003/0228812 A1 | 12/2003 | Stanhope et al. | |
| 2004/0138083 A1 | 7/2004 | Kimbrell, Jr. et al. | 510/392 |
| 2005/0085145 A1 | 4/2005 | Fang et al. | |
| 2006/0292953 A1 | 12/2006 | Ashley et al. | 442/197 |
| 2008/0038973 A1 | 2/2008 | Sasser et al. | |

FOREIGN PATENT DOCUMENTS

| | | |
|---|---|---|
| EP | 0 688 898 A1 | 12/1995 |
| EP | 0 704 570 | 4/1996 |
| JP | 52128498 | * 10/1977 |

OTHER PUBLICATIONS

U.S. Appl. No. 11/503,006, filed Aug. 10, 2006, Sasser et al.

* cited by examiner

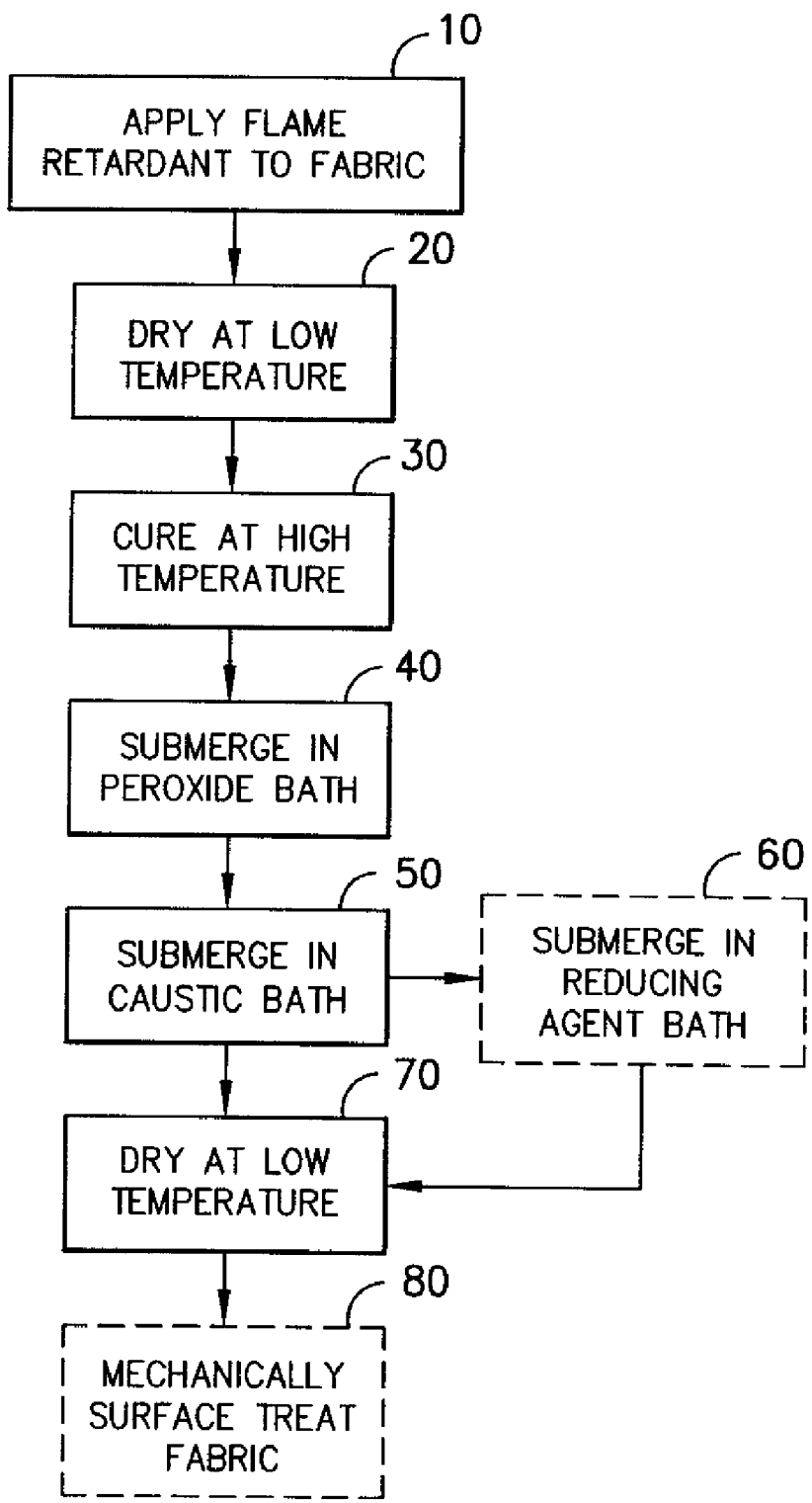
FIG. -1- ns associated with installing an ammonia chamber and requisite environmental controls, as well as the expenses associated with its operation and maintenance. Although fabrics produced by the ammonia process possess a soft hand and good tear strength, they tend to have poor wrinkle resistance and appearance retention. In addition, the method in which they are produced limits the ability to apply additional finishing agents (e.g., soil repel agents, stain release agents, permanent press resins, and the like) due to the tendency of malodors to be generated when the fabrics are heat-set at high temperatures. Finally, because the ammonia process tends to preferentially bind the flame retardant chemical to the cellulosic fibers in the fabric, the amount of synthetic fiber content has heretofore been limited to less than 30%.

FLAME RESISTANT FABRICS HAVING A HIGH SYNTHETIC CONTENT AND PROCESS FOR MAKING

CROSS-REFERENCE TO RELATED APPLICATIONS

This application is a continuation of U.S. patent application Ser. No. 11/765,002, filed Jun. 19, 2007, now abandoned, entitled "Flame Resistant Fabrics Having a High Synthetic Content and Process for Making," the contents of which are hereby incorporated by reference as if fully set forth herein.

TECHNICAL FIELD

Described herein are processes for imparting flame resistance to fabrics having a high synthetic content (in at least one embodiment, up to 65%) and to flame resistant fabrics having such synthetic content. Specifically, the processes include the application and curing of one or more flame retardant compounds, the neutralization of odors associated with such compounds, and, optionally, the mechanical surface treatment of the fabrics treated with the flame retardant compounds. The resultant fabrics have a durable flame resistant finish and exhibit permanent press characteristics, soft hand, and good tear strength, these latter characteristics being atypical of conventional flame resistant fabrics.

BACKGROUND

The term "flame resistant" is used to describe a material that burns slowly or that is self-extinguishing after removal of an external source of ignition. A fabric or yarn may be flame resistant because of the innate properties of the fiber, the twist level of the yarn, the fabric construction, or, as will be discussed herein, the presence of flame retardant chemicals applied to the fabric. The term "flame retardant" or "flame retardant chemical" refers to a chemical compound that may be applied as a topical treatment to a fiber, fabric, or other textile item during processing to reduce its flammability.

Flame resistant fabrics are useful in a number of areas, including the production of garments worn by workers in a variety of industries, including the military, electrical (for arc protection), petroleum chemical manufacturing, and emergency response. Because imparting flame resistance to cellulosic fabrics is relatively routine, the fabrics used in these applications typically have a high cellulosic content (often, 70% or more). Unfortunately, fabrics with such high cellulosic content tend to exhibit deficiencies in terms of durability, abrasion resistance, and drying time that make them unsuitable for a number of applications, including, for example, uniform and protective garments. For these reasons, manufacturers have long sought ways of incorporating higher percentages of synthetic fibers into these fabrics. The difficulty with accommodating this desire is the tendency of the synthetic fibers to burn or melt and the tendency of the hydrophobic synthetic fibers to resist penetration of the flame retardant, thereby making them unsuitable for use in large percentages.

Until now, to achieve flame resistant properties in cellulosic-containing fabrics, the fabrics have been subjected to an "ammonia process," in which the target fabric is dipped in a bath containing a phosphorous-based flame retardant chemical, dried at relatively low temperatures, conveyed through a chamber containing gaseous ammonia, and then dipped in separate baths of peroxide and caustic before drying. One obvious disadvantage of this process is the high capital invest- An alternate approach, which was considered but not widely accepted for commercial use, involves padding a phosphorous-based flame retardant chemical onto a target fabric and then curing the treated fabric at high temperatures. This process results in fabric with low tear strength, due to the flame retardant chemical interacting too vigorously with the cellulosic fibers, and with a stiff hand. These characteristics render the fabrics produced using this process unsuitable for use as apparel fabrics.

The present process overcomes the shortcomings of the previous approaches by providing an alternative mechanism by which one or more flame retardant chemicals may be fixed on a target textile substrate. As a result, the fabrics exhibit a durable finish, and larger amounts of synthetic fibers may successfully be incorporated into the fabrics without a loss of flame resistance. These larger amounts of synthetic fibers contribute significantly to increasing the durability and the tear strength of the treated fabrics.

SUMMARY

Provided herein are flame resistant fabrics having a synthetic fiber content of as much as 65% (where no more than 5% of the fibers are inherently flame resistant). The flame resistant properties are imparted by treating the fabric with one or more flame retardant chemicals and then by curing the treated fabric at high temperatures. Optionally, softeners, stain release agents, soil repellent agents, permanent press resins, and the like may be added to the bath of flame retardant chemicals without introducing one or more additional manufacturing processes. Alternately, the treated fabric may be subjected to mechanical face finishing to increase softness. The fabrics produced by the present process exhibit improved performance and tear strength, as compared to conventionally treated fabrics.

BRIEF DESCRIPTION OF THE DRAWINGS

FIG. 1 is a flow chart of representative process steps for imparting flame resistance to target fabrics, which includes the ammonia process previously used and the present process.

DETAILED DESCRIPTION

Target Textile Fabrics

The process described herein is suitable for use with a variety of textile fabrics, including those having a relatively high synthetic content. The weight percentages of cellulosic yarns and synthetic yarns contribute significantly to the success of the fabric in meeting flammability and other fabric requirements (for example, durability and hand). In one embodiment, the fabrics have a synthetic content of between about 30% and about 50% and a cellulosic content of between about 50% and about 70%. In a second embodiment, the fabrics have a synthetic content of between 30% and 65% and a cellulosic content of between about 35% and about 70%.

While the term "synthetic" or "synthetic fiber" generally refers to all chemically produced fibers to distinguish them from natural fibers, and while this process is applicable to most, if not all, synthetic fiber types, the preferred fiber types used herein are thermoplastics. The percentages provided above are applicable to thermoplastic fibers, as well as the broader class of synthetic fibers. "Thermoplastic" fibers are those that are permanently fusible and that may melt at higher temperatures. Examples of thermoplastic fibers used herein are polyesters (such as polyethylene terephthalate, polypropylene terephthalate, and polybutylene terephthalate), polyolefins (such as polyethylene and polypropylene), polyamides (such as nylon 6, nylon 6,6, nylon 4,6, and nylon 12), polyphenylenesulfide, and the like. Advantageously, the inclusion of such thermoplastic materials into the target fabrics, especially at fiber content levels of at least 30%, increases the mechanical properties (i.e., abrasion resistance, durability, etc.) of the fabrics.

The term "cellulosic" or "cellulosic fiber" generally refers to a fiber composed of, or derived from, cellulosic, which is a chief component of the cell walls of plants. Examples of cellulosic fibers include cotton, rayon, linen, jute, hemp, cellulose acetate, although the most common example is cotton and, as such, cotton will be the focus of the present disclosure. Historically, the cellulosic content of blended fabrics contributes significantly to its hand, drape, and breathability, characteristics which provide comfort to wearers thereof. Moreover, traditional flame retardant processes have preferentially treated the cellulosic content of such blended fabrics, thereby imparting flame resistance to the fabric.

It should be understood that one or more thermoplastic fiber types may be incorporated in the desired content amount with one or more cellulosic fibers. Further, non-thermoplastic synthetic fibers, such as carbon fibers, polyaramid fibers, polyacrylic fibers, aromatic polyamide, aromatic polyester, melamine formaldehyde polymer, polyimide, polysulfone, polyketone, polysulfone amide, and any combination thereof, may also be used in the blended fabrics, provided the content (by weight of the fabric) of such fibers is less than about 5% (that is, the percentage of such non-thermoplastic fibers is between 0% and about 5%). When present, the non-thermoplastic synthetic fibers are preferably present in an amount of between about 1% and about 5% based on the weight of the fabric. These non-thermoplastic fibers may inherently be flame resistant and may contribute this and/or other desirable properties to the fabric.

The fabrics may be woven, knit, or nonwoven. For apparel applications, woven or knit constructions may be preferred. The fabric may have any suitable fabric weight for the intended application, for example, ranging from about 4 oz/yd$^2$ to about 12 oz/yd$^2$ for apparel and protective end uses.

Once the fabric is constructed (for example, woven or knitted), it is prepared using conventional textile processes, such as desizing, bleaching, and scouring. If desired, the fabric may then be dyed and/or printed. The dyed and/or printed fabric is then treated to obtain flame resistant characteristics, according to the process steps described herein.

Flame Retardant Chemicals

One preferred flame retardant chemistry for this application is the reaction product of tetra (hydroxymethyl) phosphonium ("THP") salt or its condensate with one of urea, guanidines, guanyl urea, glycolurit, and polyamines. The term "tetrahydroxymethylphosphonium salt" includes the salts of chloride, sulfate, acetate, carbonate, borate, and phosphate. The condensate may include the condensation product of the THP salt with urea, guanazole, and biguanide.

In practice, a phosphorous-based component from the THP compound penetrates within the cellulosic fibers, thereby imparting durable flame resistant properties to the treated fabric. One example of such a compound is sold under the tradename PYROSAN® C—FR (having 72% solids and 10% active phosphorous) by Emerald Performance Materials.

The optimum add-on level of the flame retardant chemical depends on the fabric weight and construction. Usually, for apparel applications where lighter weight fabrics are used, it is preferable to achieve an add-on level of 2.5%-4.0% phosphorous, based on the weight of the untreated fabric. Too little and, ironically, too much flame retardant seem to impair the fabric's ability to meet flammability standards.

In one embodiment, an aromatic halogenated compound is used in addition to the phosphorous-based flame retardant compound. Aromatic halogenated flame retardants possess excellent UV-light stability and excellent heat stability, even at the elevated temperatures associated with curing, as compared with aliphatic halogenated compounds. The term "aromatic halogenated compound" refers to a compound having at least one halogen radical (e.g., bromine) covalently attached to an aromatic ring structure. Examples of aromatic brominated compounds include, for example, ethane-1,2-bis (pentabromophenyl); tetrabromophthalate esters; tetrabromobisphenyl A and its derivatives; and ethylenebromobistetrabromophthalimide. Other aromatic halogenated compounds, as are known in the art, may be used in place of the brominated compounds listed above. Preferably, the aromatic halogenated compounds have a melting temperature of equal to or less than 40° C., making them liquids at room temperature.

Representative Process Steps

FIG. 1 provides a flow chart of representative processes for imparting flame resistance to a textile substrate.

Block 10 involves the application of the selected flame retardant chemical(s) to the target textile fabric. An objective of this step of the process is to impregnate the fabric with the treatment chemistry (and optional additives, as will be discussed below), which is accomplished by saturating the fabric with the solution to allow thorough penetration into the fabric. Preferably, this is accomplished by padding—that is, passing the target fabric through an aqueous bath containing a solution of the flame retardant agent and any other desired additives and subsequently through nip rollers. Alternately, the fabric may be sprayed or coated, using any known coating techniques.

Padding may be done on any conventional equipment, but equipment having nip rolls is preferred to ensure good penetration of the bath chemistry into the fabric. Assuming an 85% wet pick-up rate, a typical pad bath created to achieve a 4% phosphorous deposit would include roughly equal parts of water and flame retardant with small amounts of wetting agents, softeners, and buffers (e.g., sodium acetate). It has been found that, to increase the stability of the bath, the components are preferably combined in the following order: wetting agent and water, buffer, softener, and flame retardant(s). Stirring is used to effectuate proper combination.

When the formulation is prepared, a small amount of alkaline material is added to adjust the pH to the range of about 5 to about 8 and, more preferably, to the range of about 5 to about 7. It has been found that, when the pH is too low, incomplete curing tends to result. Conversely, when the pH is too high, wash durability of the flame resistant finish is adversely affected.

Preferably, a softening agent (also known as a "softener") is included in the flame retardant chemical bath to improve the hand of the treated fabric. Clearly, the softening agent selected for this purpose should not have a deleterious effect on the flammability of the resultant fabric. For example, silicone and silicone-based softeners provide excellent hand, but negatively affect the flammability of the fabric. Therefore, rather than using silicone-based softeners, one or more of polyolefins, ethoxylated alcohols, ethoxylated ester oils, alkyl glycerides, alkylamines, quaternary alkylamines, halogenated waxes, and halogenated esters are instead used to impart softness to the treated fabric. In one embodiment, aromatic halogenated compounds having a melting temperature less than 40° C., such as those described above, may be used in addition to, or in place of, the previously mentioned softening agents. Such aromatic halogenated compounds provide the dual benefit of imparting flame resistance and softness.

In addition to softening agents, other textile finishing compounds may be added to the bath solution, including, but not limited to, wetting agents, surfactants, stain release agents, soil repel agents, antimicrobial compounds, wicking agents, anti-static agents, antimicrobials, antifungals, and the like. Advantageously, chemicals that require, or benefit from, heat-setting or curing at high temperatures may be successfully incorporated into the flame retardant bath chemistry.

One potentially preferred combination of chemistries for imparting wash durable stain resistance and stain release is described in US Patent Application Publication No. 2004/0138083 to Kimbrell et al., the contents of which are hereby incorporated by reference. Briefly, the compositions useful for rendering a substrate with durable stain resistance and stain release are typically comprised of a hydrophilic stain release agent, a hydrophobic stain repellency agent, a hydrophobic cross-linking agent, and optionally, other additives to impart various desirable attributes to the substrate. In this publication, new chemical compositions are contemplated wherein the relative amount and chain length of each of the aforementioned chemical agents may be optimized to achieve the desired level of performance for different target substrates within a single chemical composition.

Hydrophilic stain release agents may include ethoxylated polyesters, sulfonated polyesters, ethoxylated nylons, carboxylated acrylics, cellulose ethers or esters, hydrolyzed polymaleic anhydride polymers, polyvinylalcohol polymers, polyacrylamide polymers, hydrophilic fluorinated stain release polymers, ethoxylated silicone polymers, polyoxyethylene polymers, polyoxyethylene-polyoxypropylene copolymers, and the like, or combinations thereof. Hydrophilic fluorinated stain release polymers may be preferred stain release agents. Potentially preferred, non-limiting, compounds of this type include UNIDYNE® TG-992 and UNIDYNE® S-2003, both available from Daikin Corporation; REPEARL® SR1100, available from Mitsubishi Corporation; ZONYL® 7910, available from DuPont; and NUVA® 4118 (liquid) from Clariant. Treatment of a substrate with a hydrophilic stain release agent generally results in a surface that exhibits a high surface energy.

Hydrophobic stain repellency agents include waxes, silicones, certain hydrophobic resins, fluoropolymers, and the like, or combinations thereof. Fluoropolymers may be preferred stain repellency agents. Potentially preferred, non-limiting, compounds of this type include REPEARL® F8025 and REPEARL® F-89, both available from Mitsubishi Corp.; ZONYL® 7713, available from DuPont; E061, available from Asahi Glass; NUVA® N2114 (liquid), available from Clariant; and UNIDYNE® S-2000, UNIDYNE® S-2001, UNIDYNE® S-2002, all of which are available from Daikin Corporation. Treatment of a substrate with a hydrophobic stain repellency agent generally results in a surface that exhibits a low surface energy.

Hydrophobic cross-linking agents include those cross-linking agents which are insoluble in water. More specifically, hydrophobic cross-linking agents may include monomers containing blocked isocyanates (such as blocked diisocyanates), polymers containing blocked isocyanates (such as blocked diisocyanates), epoxy containing compounds, and the like, or combinations thereof. Diisocyanate containing monomers or diisocyanate containing polymers may be the preferred cross-linking agents. However, monomers or polymers containing two or more blocked isocyanate compounds may be the most preferred cross-linking agents. One potentially preferred cross-linking agent is REPEARL® ME, also available from Mitsubishi Corp. Others include ARKOPHOB® DAN, available from Clariant, EPI-REZ® 5003 W55, available from Shell, and HYDROPHOBOL® XAN, available from DuPont.

The total amount of the chemical composition applied to a substrate, as well as the proportions of each of the chemical agents comprising the chemical composition, may vary over a wide range. The total amount of chemical composition applied to a substrate will depend generally on the composition of the substrate, the level of durability required for a given end-use application, and the cost of the chemical composition. As a general guideline, the total amount of chemical solids applied to the substrate will be found in the range of about 10% to about 40% on weight of the substrate. More preferably, the total amount of chemical solids applied to the substrate may be found in the range of about 20% to about 30% on weight of the substrate. Typical solids proportions and concentration ratios of stain repellency agent to stain release agent to cross-linking agent may be found in the range of about 10:1:0 and about 1:10:5, including all proportions and ratios that may be found within this range. Preferably, solids proportions and concentration ratios of stain repellency agent to stain release agent to cross-linking agent may be found in the range of about 5:1:0 and about 1:5:2. Most preferably, solids proportions and concentration ratios of stain repellency agent to stain release agent to cross-linking agent may be 1:2:1.

The proportion of stain release agent to stain repellency agent to cross-linking agent may likewise be varied based on the relative importance of each property being modified. For example, higher levels of repellency may be required for a given end-use application. As a result, the amount of repellency agent, relative to the amount of stain release agent, may be increased. Alternatively, higher levels of stain release may be deemed more important than high levels of stain repellency. In this instance, the amount of stain release agent may be increased, relative to the amount of stain repellency agent.

Optionally, in addition to, or in place of, the stain release and/or stain repellency agents described above, halogenated lattices may be added to the flame retardant bath to further enhance the durability of the flame resistant finish. The term "halogenated lattices" refers to homopolymers and copolymers of polyvinyl chloride, polyvinylidene chloride, brominated polystyrene, chlorinated olefins, polychloroprenes, and the like.

Block 20 refers to the step of drying the treated fabric at low temperatures. In this instance, the term "low temperature"

encompasses temperatures generally less than about 150° C. and, most preferably, between about 100° C. and about 150° C. This low temperature drying may occur in any conventional type of drying apparatus for a time sufficient to remove from about 85% to about 100% of the moisture content of the fabric. Although this step is preferred for most applications, particularly for ensuring uniform treatment across the fabric and consistency of flame resistant properties, it may be shortened or replaced by the application of high temperature heat in a single step (block 30).

Block 30 incorporates the step of curing the treated fabric at high temperatures. In this case, the term "high temperature" encompasses temperatures ranging from about 150° C. to about 190° C. and, more preferably, from about 160° C. to about 180° C., such temperatures being used for a period of time ranging from about 20 seconds to about 180 seconds. It has been found that temperatures lower than about 150° C. are insufficient to cure the flame retardant chemistry and that temperatures higher than about 190° C. tend to promote an excessive reaction between the flame retardant chemistry and the cellulosic fibers that degrades and weakens the fabric.

To complete the reaction of the flame retardant chemical within the fabric, the treated fabric should be oxidized to convert the trivalent phosphorous into the innocuous pentavalent form, to remove any residual odor from the cured fabric, and to produce maximum durability of the flame retardant fabric for extended washings. Oxidation may occur in a continuous process (such as by impregnating the cured fabric with a peroxide solution on a continuous range) or in a batch process (such as by submerging the cured fabric in a peroxide solution in a bath, vat, or jet vessel).

In a continuous process, such as that shown in FIG. 1, the first box should contain an aqueous solution of an oxidizing agent (for example, hydrogen peroxide) and, optionally, a wetting agent and/or surfactant. This solution causes substantial conversion of the phosphine compound mentioned above to a stable and durable pentavalent phosphate compound polymerized within the fabric. The cured fabric is immersed in this peroxide bath, as shown at Block 40, to remove odors that may have been generated during the curing process. The peroxide bath contains a solution having between about 3% and about 50% of a peroxide, such as hydrogen peroxide. The preferred period for submersion ranges from about 10 seconds to about 90 seconds. The peroxide bath may optionally be heated to temperatures between about 30° C. and about 50° C.

Block 50 involves the submersion of the fabric in a neutralizing solution made of an appropriate concentration of caustic. Preferably, although not absolutely required, the fabric is immersed in a caustic bath containing from about 2% to about 4% caustic for a period of about 60 seconds. After being immersed in the caustic bath, the fabric is then rinsed in water to remove any residual alkali from the neutralized fabric. Preferably, the water is hot (at temperatures between about 49° C. to about 60° C.).

Optionally, as shown in Block 60, the fabric is then conveyed through a bath containing from about 1% to about 20% of a reducing agent to reduce the release amount of formaldehyde on the fabric. Preferably, the temperature of the reducing agent bath is from about 20° C. to about 80° C., and the exposure time of the fabric to the bath is about 60 seconds. Suitable reducing agents include organic or inorganic compounds that react with formaldehyde at the temperatures mentioned above (that is, from about 20° C. to about 80° C.), examples of which include, but are not limited to, sodium bisulfite, ammonium bisulfite, sodium thiosulfite, thiourea, diethylene glycol, phenols, thiophenols, hindered amines, and the like.

In block 70, the fabric is then dried at a relatively low temperature (that is, less than the curing temperature) to remove moisture from the fabric.

To further enhance the fabric's hand, the fabric may optionally be treated with a mechanical surface treatment, as shown in block 80. The mechanical surface treatment, as described below, relaxes stress imparted to the fabric during curing and fabric handling, breaks up yarn bundles stiffened during curing, and increases the tear strength of the treated fabric.

Representative examples of such mechanical surface treatments include treatment with high-pressure streams of air or water, as described in U.S. Pat. No. 4,918,795 to Dischler; U.S. Pat. No. 5,033,143 to Love, III; and U.S. Pat. No. 6,546,605 to Emery et al.; treatment with steam jets; needling; particle bombardment; ice-blasting; tumbling; stone-washing; constricting through a jet orifice; and treatment with mechanical vibration, sharp bending, shear, or compression. A sanforizing process may be used instead of, or in addition to, one or more of the above processes to improve the fabric's hand and to control the fabric's shrinkage.

Additional mechanical treatments that may be used to impart softness to the treated fabric, and which may also be followed by a sanforizing process, include napping; napping with diamond-coated napping wire; gritless sanding; patterned sanding against an embossed surface; shot-peening; sand-blasting; brushing; impregnated brush rolls; ultrasonic agitation; sueding; engraved or patterned roll abrasion; impacting against or with another material, such as the same or a different fabric, abrasive substrates, steel wool, diamond grit rolls, tungsten carbide rolls, etched or scarred rolls, or sandpaper rolls; and the like.

Any of these treatments provide a similar effect in terms of softening the fabric by breaking up the flame retardant finish, separating the fibers (within the yarn bundle) from one another, and flexing the individual yarns, thereby increasing the flexibility and tear strength of the treated fabric.

Importantly, the resulting flame resistant fabrics successfully meet the flammability requirements for many end-uses. Furthermore, these fabrics tend to exhibit the characteristics of fabrics treated with permanent press resins—that is, the tendency to resist wrinkling, to retain its shape, and to retain a crease or pleat through laundering—without the use of additional permanent press resins. These fabrics typically do not require ironing if they are tumble dried, making them advantageous for use as uniform fabrics.

As mentioned above, stain release agents and/or stain repellency agents may be incorporated, either separately or in combination, into the flame resistant bath to provide the additional properties of stain release and/or stain repellency. These properties may be achieved without the need for subsequent process steps, which increase production time and cost. Moreover, the use of the preferred stain release and stain repel agents described previously has no detrimental effect on the ability of the treated fabric to meet flammability requirements. In some circumstances, the incorporation of these compounds into the flame retardant bath results in improved durability of the flame retardant treatment.

The following non-limiting examples are representative of flame resistant fabrics manufactured according to the present processes.

Example 1

A flame retardant treatment formulation was created, which contained the following components:

| Component (Source) | Amount |
| --- | --- |
| Tetrahydroxymethyl phosphonium urea condensate (sold by Emerald Performance Materials under the tradename PYROSAN® C-FR) | 40 parts by weight |
| Softening agent, which was a mixture of ethoxylated alcohol and alkyl ester (sold by Boehme Filatex under the tradename HIPOSOFT® SFBR) | 16 parts by weight |
| Urea (from Aldrich Corporation) | 7 parts by weight |
| Sodium hydroxide solution, 12% by weight | 1 part by weight |
| Water | 36 parts by weight |

A woven fabric having a fiber content of about 40% polyester fiber and about 60% cotton fiber was impregnated with the above solution by padding, resulting in a wet pick-up of about 60% by weight. The fabric was then dried for about 4 minutes in a convection oven at a temperature of about 121° C. (250° F.). The fabric was then cured in the same convection oven at a temperature of about 177° C. (350° F.) for 2-3 minutes.

The fabric was then immersed in an aqueous solution containing hydrogen peroxide (3.5% by weight) at about 40° C. for about 60 seconds. Immediately thereafter, the fabric was immersed in an aqueous solution containing sodium hydroxide (2% by weight) at ambient temperature for about 120 seconds. The fabric was then rinsed in tap water 3 to 5 times and dried. Finally, the fabric was subjected to mechanical treatment via a plurality of high pressure (40-90 p.s.i.g.) air jets, which induced vibration in the fabric and which resulted in a softening of the fabric hand and an improvement in tear strength.

Evaluation: Flame Resistance and Durability of Flame Resistant Finish

The fabric was then tested for flame resistance according to National Fire Prevention Association (NFPA) Test Standard 701, entitled "Standard Methods for Fire Tests for Flame Resistant Textiles and Films." The fabric exhibited a char length of about 12.7 centimeters (5 inches), no melt or drip of molten fabric, and no after-flame after removal of the ignition source. These results are indicative of a successfully manufactured flame resistant fabric.

The fabric was then subjected to industrial laundering 25, 75, and 100 times, after which the fabric was evaluated according to NFPA Standard 701. The flame resistant performance of the fabric remained constant at about 12.7 centimeters (5 inches), despite repeated launderings.

Evaluation: Tensile and Tear Strengths

The tensile and tear strengths of the fabric were also evaluated, according to test methods ASTM D5034 and ASTM D2261, respectively, both before and after flame resistant treatment (as described above). The results are shown below.

| Test (yarn direction) | Before FR Treatment | After FR Treatment |
| --- | --- | --- |
| Tensile strength (warp) | 153 lb. force | 126 lb. force |
| Tensile strength (fill) | 74 lb. force | 68 lb. force |
| Tear strength (warp) | 11 lb. force | 11 lb. force |
| Tear strength (fill) | 9 lb. force | 6 lb. force |

Thus, the treated fabric did not exhibit any significant loss of tensile strength or tear strength as a result of the treatment process or the addition of the treatment chemistry.

Evaluation: Appearance

The treated fabric exhibited good wrinkle resistance and appearance retention, both after application of the treatment chemistry and after repeated launderings.

Example 2

The treatment formulation was the same as that used in EXAMPLE 1, except that 6 parts by weight of a fluorocarbon soil repellent finishing agent (sold by Mitsubishi Corporation under the tradename REPEARL® F7000) was added to the formulation. The fabric and treatment process from EXAMPLE 1 was used for EXAMPLE 2.

When evaluated according to NFPA Standard 701, the resultant fabric exhibited a char length of 12.0 centimeters (4.7 inches), no melt or drip of molten fabric, and no after-flame after removal of the ignition source. These results are indicative of a successfully manufactured flame resistant fabric.

Additionally, the treated fabric exhibited a high degree of water and soil repellence without compromising the flame resistant properties of the fabric.

Example 3

The treatment formulation was the same as that used in EXAMPLE 1, except that 12% by weight of the formulation of an anionic phosphate ester-plasticized vinyl chloride copolymer emulsion (sold by Noveon Coatings, Inc. under the tradename VYCAR® 590×20) was added to the formulation. The fabric and treatment process from EXAMPLE 1 was used for EXAMPLE 3.

When evaluated according to NFPA Standard 701, the resultant fabric exhibited a char length of 12.0 centimeters (4.7 inches).

Example 4

A flame retardant treatment formulation was created, which contained the following components:

| Component (Source) | Amount |
| --- | --- |
| Tetrahydroxymethyl phosphonium urea condensate (sold by Emerald Performance Materials under the tradename PYROSAN® C-FR) | 40% by weight |
| Urea (from Aldrich Corporation) | 7% by weight |
| Sodium hydroxide solution, 12% by weight | 1% by weight |
| Water | 52% by weight |

A woven fabric having a fiber content of about 50% polyester fiber and about 50% cotton fiber, which was purchased from an unknown source, was scoured before treatment to remove any finishing agents. The scoured fabric was impregnated with the above solution by padding with a nip roll pressure of about 40 p.s.i.g. The fabric was then dried for about 4 minutes in a convection oven at a temperature of about 121° C. (250° F.). The fabric was then cured in the same convection oven at a temperature of about 177° C. (350° F.) for about 3 minutes.

The fabric was then immersed in an aqueous solution containing hydrogen peroxide (3.5% by weight) at about 40° C. for about 60 seconds. Immediately thereafter, the fabric was immersed in an aqueous solution containing sodium hydroxide (2% by weight) at ambient temperature for about 120 seconds.

The fabric was then washed with hot water for ten home laundry cycles, dried, and evaluated according to NFPA Standard 701. The fabric exhibited a char length of about 18.3 centimeters (7.2 inches) and no after-flame after removal of the ignition source.

Example 5

A flame retardant treatment formulation was created, which contained the following components:

| Component (Source) | Amount |
| --- | --- |
| Tetrabromophthalic anhydride derivative (sold by Great Lakes Chemical under the tradename FIREMASTER ® BZ-54) | 5 parts by weight |
| Emulsifier, an organo-phosphoric acid ester (sold by Harcros Chemicals, Inc. under the tradename T-MULZ ® 598) | 1 part by weight |
| Tetrahydroxymethyl phosphonium urea condensate (sold by Cytec Industries under the tradename PYROSET ® TPO) | 50 parts by weight |
| Urea (from Aldrich Corporation) Water | 7 parts by weight |

The brominated flame retardant and the emulsifier were combined with water to form a stable emulsion. The emulsion was then mixed with the tetrahydroxymethyl phosphonium urea condensate, urea, and water. A small amount of sodium hydroxide was added to the solution to adjust the pH to about 6.

A woven fabric having a fiber content of about 65% polyester fiber and about 35% cotton fiber was impregnated with the above solution by padding with a nip roll pressure of about 40 p.s.i.g. The fabric was then dried and cured for about 3 minutes in a convection oven at a temperature of about 204° C. (400° F.).

The fabric was then immersed in an aqueous solution containing hydrogen peroxide (5% by weight) for a few minutes. Immediately thereafter, the fabric was immersed in an aqueous solution containing sodium hydroxide (2% by weight) at ambient temperature for about 120 seconds.

The fabric was then laundered in a home washing machine at a water temperature of about 46° C. (115° F.) and tumble-dried. The washing and drying process was repeated for 50 cycles. The treated fabric exhibited very soft hand, even without the addition of a traditional softening agent in the treatment formulation.

The treated fabric was then tested for flame resistance, according to NFPA Standard 701. The fabric exhibited a char length of about 15.2 centimeters (6 inches), no melt or drip of molten fabric, and no after-flame after removal of the ignition source. These results are indicative of a successfully manufactured flame resistant fabric, despite the high synthetic content and the low cellulosic content of the fabric.

COMPARATIVE EXAMPLE

The same fabric used in EXAMPLE 1 was used for this comparative example. The fabric was padded with an aqueous solution containing about 40% by weight of tetrahydroxymethyl phosphonium urea condensate (sold by Emerald Performance Materials under the tradename PYROSANO® C-FR) with a nip roll pressure of about 40 p.s.i., resulting in a wet pick-up of about 60%.

The fabric was dried at about 99° C. (210° F.) for about 75 seconds to reach a moisture content of about 15%. The fabric was then placed in a chamber with ammonia vapor at 60° C. for about 3 minutes.

Afterward, the fabric was immersed in a solution containing hydrogen peroxide (3.5% by weight) at 40° C. for about one minute. Then, the fabric was immersed in a solution containing 2% caustic for about two minutes, after which the fabric was rinsed with water and dried.

The ammonia-treated fabric was then laundered 50 times in water having a temperature of about 46° C. (115° F.) in a standard home washing machine and evaluated for the durability of the flame resistant finishing, using procedures according to NFPA Standard 701. The flame spread across the entire fabric test swatch, causing the entire 25.4-centimeter (10-inch) sample to burn over its length. Once the ignition source was removed, the after-flame time was more than 10 seconds. This example demonstrates that the ammonia treatment process is insufficient in creating a wash-durable flame resistant finish for fabrics with a thermoplastic content greater than 30%.

We claim:

1. A flame resistant fabric, said flame resistant fabric comprising:
    a fabric substrate, wherein said fabric substrate has cellulosic fibers and thermoplastic fibers, said cellulosic fibers being present in an amount between about 50% and about 70% of the weight of said fabric and said thermoplastic fibers being present in an amount between about 30% and about 50% of the weight of said fabric; and
    a finish applied to said fabric substrate, wherein said finish comprises a softening agent and a pentavalent phosphorous compound, the pentavalent phosphorous compound being a product produced by first heat-curing and then oxidizing a reaction mixture comprising (i) urea and (ii) a compound selected from the group consisting of tetrahydroxymethyl phosphonium salts and tetrahydroxymethyl phosphonium condensates, the tetrahydroxymethyl phosphonium condensate being produced by reacting a tetrahydroxymethyl phosphonium salt with a compound selected from the group consisting of urea, guanazole, and biguanide;
    wherein at least a portion of said cellulosic fibers have the pentavalent phosphorous compound polymerized therein.

2. The flame resistant fabric of claim 1, wherein said thermoplastic fibers are selected from the group consisting of polyesters, polyamides, and polyphenylsulfide.

3. The flame resistant fabric of claim 1, wherein said cellulosic fibers are cotton and said thermoplastic fibers are polyester.

4. The flame resistant fabric of claim 1, wherein said fabric substrate further comprises a non-thermoplastic synthetic fiber, said non-thermoplastic synthetic fibers being present in an amount between about 1% and about 5% of the weight of said fabric and being selected from the group consisting of carbon, polyaramid, polyacrylic, aromatic polyamide, aromatic polyester, melamine formaldehyde polymer, polyimide, polysulfone, polyketone, polysulfone amide, and any combination thereof.

5. A flame resistant fabric, said flame resistant fabric comprising:
- a fabric substrate, wherein said fabric substrate has cellulosic fibers and thermoplastic fibers, said cellulosic fibers being present in an amount between about 35% and about 70% of the weight of said fabric and said thermoplastic fibers being present in an amount between about 30% and about 65% of the weight of said fabric; and
- a finish applied to said fabric substrate, wherein said finish comprises an aromatic brominated compound and a pentavalent phosphorous compound, the pentavalent phosphorous compound being a product produced by first heat-curing and then oxidizing a reaction mixture comprising (i) urea and (ii) a compound selected from the group consisting of tetrahydroxymethyl phosphonium salts and tetrahydroxymethyl phosphonium condensates, the tetrahydroxymethyl phosphonium condensate being produced by reacting a tetrahydroxymethyl phosphonium salt with a compound selected from the group consisting of urea, guanazole, and biguanide;
- wherein at least a portion of said cellulosic fibers have the pentavalent phosphorous compound polymerized therein.

6. The flame resistant fabric of claim 5, wherein said thermoplastic fibers are selected from the group consisting of polyesters, polyamides, and polyphenylsulfide.

7. The flame resistant fabric of claim 5, wherein said cellulosic fibers are cotton and said thermoplastic fibers are polyester.

8. The flame resistant fabric of claim 5, wherein said fabric substrate further comprises a non-thermoplastic synthetic fiber, said non-thermoplastic synthetic fibers being present in an amount between about 1% and about 5% of the weight of said fabric and being selected from the group consisting of carbon, polyaramid, polyacrylic, aromatic polyamide, aromatic polyester, melamine formaldehyde polymer, polyimide, polysulfone, polyketone, polysulfone amide, and any combination thereof.

9. The flame resistant fabric of claim 5, wherein said aromatic brominated compound is selected from the group consisting of ethane-1,2-bis(pentabromophenyl); tetrabromophthalate esters; tetrabromobisphenyl A and its derivatives; and ethylenebromobistetrabromophthalimide.

10. The flame resistant fabric of claim 9, wherein said aromatic brominated compound has a melting temperature of less than about 40° C.

11. A method of making a flame retardant fabric, said method comprising:
- (a) forming a fabric, said fabric comprising a first plurality of yarns in a first direction and a second plurality of yarns in a second direction substantially perpendicular to said first direction, wherein said fabric has a cellulosic fiber content of between about 50% by weight of said fabric and about 70% by weight of said fabric and a thermoplastic fiber content of between about 30% by weight of said fabric and about 50% by weight of said fabric;
- (b) applying to said fabric a finishing composition, said finishing composition comprising a softening agent, urea, and a tetrahydroxymethyl phosphonium condensate, the tetrahydroxymethyl phosphonium condensate being produced by reacting a tetrahydroxymethyl phosphonium salt with a compound selected from the group consisting of urea, guanazole, and biguanide; and
- (c) curing said finish on said fabric by subjecting said fabric to temperatures between about 150° C. and about 190° C.;
- (d) oxidizing said cured fabric using a peroxide to convert said tetrahydroxymethyl phosphonium condensate into a pentavalent phosphate compound;
- (e) immersing said cured fabric in a caustic solution that neutralizes the peroxide of step (d); and
- (f) immersing said cured fabric in a solution containing a reducing agent.

12. The method of claim 11, further comprising step (g) in which said cured fabric is subjected to mechanical treatment.

13. The method of claim 11, wherein said finishing composition of step (b) further comprises an aromatic brominated compound with a melting temperature less than 40° C.

14. The method of claim 11, wherein said finishing composition of step (b) further comprises additives selected from the group consisting of stain release agents, stain repellency agents, and combinations of stain release agents and stain repellency agents.

15. The method of claim 11, wherein said curing of step (c) occurs at temperatures between about 160° C. and about 180° C.

* * * * *